Aug. 19, 1958 — L. F. A. KNOTTNERUS — 2,848,597
RUNWAY LIGHT
Filed Oct. 29, 1956 — 2 Sheets-Sheet 1
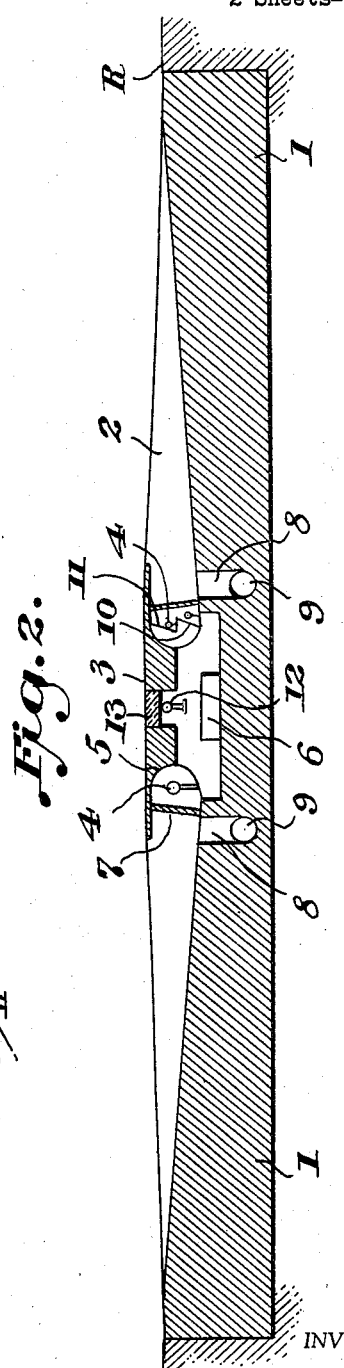
INVENTOR.
Lodewijk Frederik Arie Knottnerus,
BY
ATTYS.

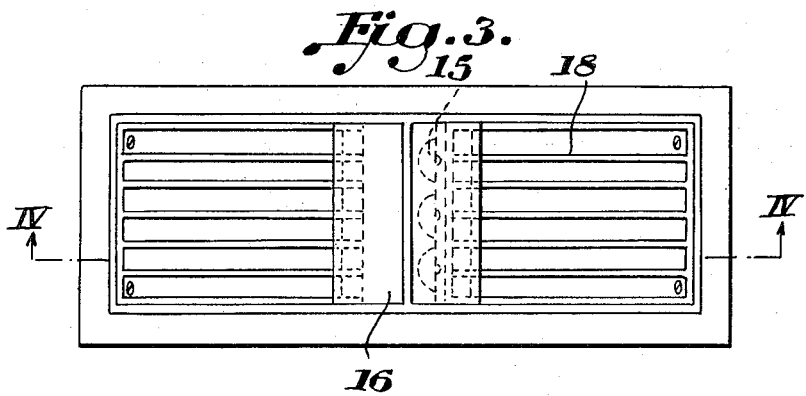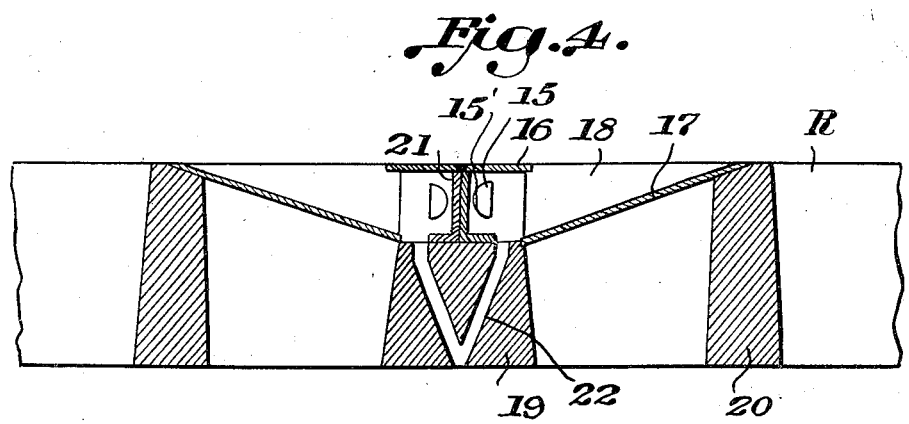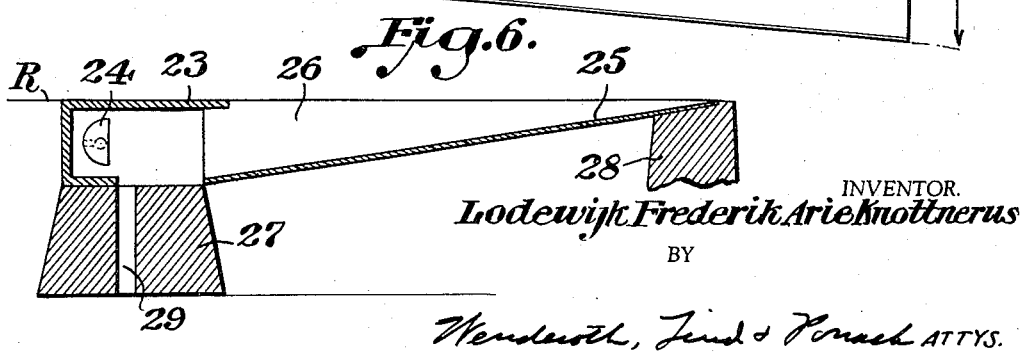

United States Patent Office 2,848,597
Patented Aug. 19, 1958

2,848,597

RUNWAY LIGHT

Lodewijk Frederik Arie Knottnerus, Amsterdam, Netherlands

Application October 29, 1956, Serial No. 618,729

Claims priority, application Netherlands March 13, 1952

9 Claims. (Cl. 240—1.2)

This invention relates to a runway light for positioning in a runway such that it projects only slightly above the surface of the runway or is flush with the surface of the runway.

This application is a continuation-in-part of application Serial No. 297,112, filed July 3, 1952 and now abandoned and application Serial No. 488,393, filed February 15, 1955 and now abandoned.

The problem of providing satisfactory runway lights has many complicating factors. Lights which are to be utilized for marking the actual runways on an airport, should be flush, or substantially flush, with the surface level of the runway whether they are on the center line of the runway or on the edge thereof. This is particularly true in the present age of high speed jet and propeller driven aircraft which have high landing and take-off speeds. The landing and take-off surface for the wheels on such high speed aircraft must be substantially completely unobstructed, because if the wheels should strike any object protruding above the runway at the high speeds at which the planes land and take-off, the airplane carried by the wheels would be thrown off course and perhaps caused to crash on the runway, or at the minimum the wheels and tires thereon would be severely damaged.

A further factor to be considered in a satisfactory runway light is the problem of visibility of such lights from the cockpit of an airplane on the runway or approaching the runway from a low angle of approach. The runway lights solving the problem of visibility of runway lights from on the runway or at a low angle thereto have, to date, been incompatible with the requirement that the lights be flush or substantially flush, most of the runway lights which are visible from the runway or at a low angle thereto projecting above the surface of the runway. Further, in the approach area to the runway where the lights must project their rays at a slight angle to the surface of the ground, it would be expected that lights projecting above the surface of this area would not be objectionable. However, in the case of the faster military type aircraft, the difference between the landing speed and the stalling speed is small, and it is therefore desirable to provide a perfectly level approach area on which the plane can land if the approach undershoots the end of the runway due to miscalculation on the part of the pilot or because the plane stalls. Therefore, lights in this area marking the correct approach to the runway proper should likewise be flush with the surface of the ground, and yet should project the light rays at an angle to the surface of the ground.

It is an object of the present invention to provide a runway light which is flush or substantially flush with the surface of the runway and which overcomes the drawbacks of prior art runway lights while at the same time meeting all requirements for a satisfactory runway light.

It is a further object of the present invention to provide a runway light which is set into the runway flush with the surface thereof and which can be seen at a distance from the light substantially only between 1 and 16° above the runway surface.

It is a still further object of the present invention to provide a strong, durable and easily maintainable runway light which does not interfere with the maintenance of the runway proper, such as for example the passage thereover of bladed snowplows.

Other and further objects of the present invention will become apparent from the following description and appended claims taken together with the drawings, in which:

Fig. 1 is a perspective view of a runway light according to the invention which projects only slightly above the surface of the runway;

Fig. 2 is a sectional elevation view taken along the line II—II of Fig. 1;

Fig. 3 is a plan view of a runway light according to the invention which is flush with the runway;

Fig. 4 is a sectional elevation view along the line IV—IV of Fig. 3;

Fig. 5 is a plan view of a modified form of runway light as shown in Fig. 3;

Fig. 6 is a sectional elevation view of the runway light according to Fig. 5 taken along line VI—VI of Fig. 5; and Fig. 7 is the pattern formed by the light rays from the light of Figs. 5 and 6 in relation to the runway.

The runway light shwn in Fig. 1 comprises a source of light 4 positioned immediately below the level of the runway R in which the light is adapted to be set, which source of light is directed by a reflector 5. A cover plate 3 is provided which extends over the source of light in the direction in which the source of light is directed. A base 1 extends in the direction in which the light source 4 is directed along a sloping line from a point beneath the free edge of the cover plate 3 and from below the level of the light source 4 to the level of the runway R. Inasmuch as the base 1 slopes upwardly from a point which is also beneath the level of the runway, a depression 2 will be left in the runway. In order to prevent the wheels of an airplane from falling into the depression so created, a web member 14 is provided on the base centrally of the depression 1 and which extends along the length thereof from beneath the free edge of the cover plate 3 to the intersection of the sloping base 1 and the runway R. Web members 14 project upwardly from the base 1 to the level between the free edge of the cover plate 3 over the base and the intersection of the base 1 with the runway R.

In the preferred embodiment of the runway light, the web member 14 is integral with the sloping base. The source of directed light 4 is positioned below the uppermost point of the runway light a distance which is equal to one-half the height of the reflector 5 plus the thickness of the cover plate 3. This enables the light source to be positioned as close to the level of the runway as is practically possible, thereby permitting the angle which the light rays from the source of light make with the runway to be as small as possible.

The cover plate 3 extends sufficiently far over the light source 4 in the direction in which the light source is directed so that the upper limit of the angle which the light rays from the source make with the runway R is 16°. The base 1 extends a distance from the light source 4 such that the lower limit of the angle which the light rays from the source make with the runway is approximately 1°. Thus substantially all of the light rays from the light source 4 may be concentrated in a space between 1 and 16° above the level of the runway, as shown in Fig. 7.

In the embodiment shown in Figs. 1 and 2, the cover plate 3 is raised slightly above the level of the runway, and the light is encased in a concrete block which forms the base 1. The reflector 5 is a parabolic reflector, and the front thereof is covered with a transparent closure means 7. A sump 8 is provided between the light source 4 and the cover plate 7 and the end of the base 1 beneath the cover plate 3. A drain 9 is provided in the bottom of the sump. The entire unit, being set in the concrete block, can be sunk into a runway as a pre-fabricated unit, and inasmuch as the drain 9 extends to the side of the block, a plurality of units may be placed side by side across the width of the runway with the drains 9 aligned.

In the particular embodiment shown in Figs. 1 and 2, the runway light has been shown as a double unit which projects light in opposite directions. As shown, the unit projecting light in the opposite direction from the first unit is a duplicate of the first unit with the exception that there is a plurality of light sources 4, each of which is provided with a reflector 10, 11. In this instance, the uppermost of the two light sources is immediately below the level of the runway, and in the preferred embodiment thereof, this light source is one-half the height of the reflector 10 plus the thickness of the cover plate 3 below the uppermost point on the runway light.

Between the back to back light sources may be positioned an additional light source 12 with a translucent cover 13 thereover. This enables the runway light to be seen from directly on top of the light. In addition, a transverse space 6 may be provided for electrical connection for the light sources.

The runway light shown in Figs. 3 and 4, which is flush with the level of the runway R, comprises a source of directed light 15 immediately below the level of the runway R. A cover plate 16 over the source of light 15 extends in the direction in which the light source 15 is directed. A base 17 slopes upwardly in the direction in which the light source is directed from a point beneath the edge of the cover plate 16 and below the level of the light source to the level of the runway R. A plurality of web members 18 integral with the sloping base extend along the length thereof from beneath the edge of the cover plate 16 to the intersection of the sloping base 17 and the runway R. The web members 18 project upwardly to the level between the edge of cover plate 16 and the intersection of the sloping base 17 with the runway. In this embodiment, this level is the level of the runway R. Cover plate 16 rests on the upper edges of the web members 18. The source of light is positioned on a center piling 19 set in a hole in the runway, while the end of the sloping base 17 at the runway R rests on an end piling 20 similarly set in the hole in the runway. The source of light 15 is partially encased and supported in a light support in the form of a protective casing 21 on which the cover plate 16 rests, and which in turn rests on the center piling 19.

The source of light 15 is provided with a reflector 15', and the source of light is positioned a distance below the uppermost level of the runway light which is substantially equal to one-half the height of the reflecting means 15' plus the thickness of the cover plate 16. A sump 22 is provided between the source of light 15 and the end of the sloping base 17 beneath the edge of the cover plate 16.

The cover plate 16 extends over the source of light sufficiently far so that the upper limit of the angle which the light rays from the light source make with the runway is 4°. The base 17 extends a distance from the source of light 15 such that the lower limit of the angle which the rays of light from the light source make with the runway is 1°. Thus, in the modification the light rays from the light source at a distance from the runway light are concentrated between 1 and 4° above the runway, as shown in Fig. 7.

As is the case with the embodiment of Figs. 1 and 2, the embodiment shown in Figs. 3 and 4 can be formed as a double unit with the light sources facing in opposite directions.

The embodiment shown in Figs. 5 and 6 is substantially the same as that shown in Figs. 3 and 4. It has a cover plate 23 which may be extended over a source of light 24 sufficiently far in the direction in which the light is directed to limit the angle which the light rays make with the runway R to from 4° to 16°. The sloping base 25 extends from the source of light a distance such that the lower limit of the light rays from the light source with the runway R is 1°. Web members 26 are integral with the sloping base 25 and support the edge of the cover plate 23. Concrete pilings 27 and 28 are sunk into the ground, and concrete piling 27 is provided with a sump 29. As seen in Fig. 5, the web members may diverge from the point closest to the source of light 24 to the point where the sloping base 25 intersects the runway, the angle between the two outside webs being approximately 6°. The webs at the end of base 25 at the level of the runway should be closer together than the width of the smallest tire or wheel that will be required to pass over the light, e. g. a wheel on a snowplow for clearing the runway of snow.

It is thought that the invention and its advantages will be understood from the foregoing description and it is apparent that various changes may be made in the form, construction and arrangement of the parts without departing from the spirit and scope of the invention or sacrificing its material advantages, the forms hereinbefore described and illustrated in the drawings being merely preferred embodiments thereof.

I claim:

1. A runway light for positioning at the surface level of a runway comprising a light support, a source of directed light including a curved reflector means, said source of directed light mounted on said support, a cover plate on said support over said source of light and extending in the direction in which said light source is directed, a base sloping upwardly from said light support in the direction which said light source is directed from beneath the edge of said cover plate and below the level of said light source to a level immediately above the level of said light source, said base being elongated in the direction of its slope, and at least one web member integral with said sloping base extending along the length thereof from beneath the edge of said cover plate to the end of said base which is at a level above the level of said light source, said web projecting upwardly to the level between the edge of said cover plate over said base and the end of said sloping base which is above the level of said light source.

2. A runway light as claimed in claim 1 in which said cover plate is raised slightly above the level of the upper end of said base.

3. A runway light as claimed in claim 1 in which said web has a plurality of apertures therein.

4. A runway light as claimed in claim 1 and a second directed source of light below said source of light and directed in the same direction as said source of light.

5. A runway light as claimed in claim 1 in which said light is set in a concrete block for unit installation in a runway.

6. A runway light for positioning at the surface level of a runway comprising a light support, a source of directed light including a curved reflector means mounted on said support, a cover plate on said support over said source of light and extending in the direction in which said light source is directed, said source of light positioned below said cover plate a distance substantially equal to one-half the diameter of said reflecting means, a base sloping upwardly from said light support in the direction which said light source is directed from a point beneath the edge of said cover plate and below the level of said light source to a level immediately above the level of said light source, said base being elongated in the direction of its slope, and a plurality of web members integral with said sloping base extending along the length thereof from beneath the edge of said cover plate to the end of said base which is at a level above the level of said light source, said webs projecting upwardly to the level between the edge of said cover plate over said base and the end of said sloping base immediately above the level of said light source.

7. A runway light as claimed in claim 6 in which said upwardly sloping base extends to the level of said cover plate.

8. A runway light as claimed in claim 7 in which said cover plate extends over said source of light in the direction in which said source of light is directed a distance such that the upper limit of the angle which the light rays from said light source make with the runway is from 4° to 16°, and said base extends a distance from said light source in the direction in which said light source is directed such that the lower limit of the angle which the light rays from said light source make with the runway is 1°.

9. A runway light as claimed in claim 6 and a sump between the source of light and the end of said base beneath the edge of said cover plate.

References Cited in the file of this patent

UNITED STATES PATENTS

| | | |
|---|---|---|
| 1,473,375 | Kyle | Nov. 6, 1923 |
| 2,212,537 | Coulter | Aug. 27, 1940 |
| 2,370,424 | Samuel | Feb. 16, 1954 |

FOREIGN PATENTS

| | | |
|---|---|---|
| 710,608 | Great Britain | June 16, 1954 |
| 730,227 | Great Britain | May 18, 1955 |